US006929056B2

(12) United States Patent
Meshenky et al.

(10) Patent No.: US 6,929,056 B2
(45) Date of Patent: Aug. 16, 2005

(54) TANK MANIFOLD FOR INTERNALLY MOUNTED RADIAL FLOW INTERCOOLER FOR A COMBUSTION AIR CHARGER

(75) Inventors: Steven P. Meshenky, Racine, WI (US); LeRoy Goines, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 115 days.

(21) Appl. No.: 10/313,210

(22) Filed: Dec. 6, 2002

(65) Prior Publication Data

US 2004/0107948 A1 Jun. 10, 2004

(51) Int. Cl.$^7$ .......................... F04D 23/00; F01D 25/12
(52) U.S. Cl. .................. 165/47; 165/125; 165/176; 415/176; 415/178; 415/179; 417/243
(58) Field of Search .......................... 165/47, 125, 122, 165/176; 415/179, 178, 176; 417/243

(56) References Cited

U.S. PATENT DOCUMENTS

| | | | | | |
|---|---|---|---|---|---|
| 1,265,650 | A | * | 5/1918 | Graemiger | .................. 415/179 |
| 1,425,855 | A | * | 8/1922 | Graemiger | .................. 415/179 |
| 2,384,251 | A | | 9/1945 | Hill | |
| 2,474,410 | A | | 6/1949 | Aue | |
| 2,650,073 | A | * | 8/1953 | Holm | .......................... 165/140 |
| 2,925,954 | A | * | 2/1960 | Spillmann et al. | .......... 415/179 |
| 3,014,639 | A | * | 12/1961 | Boli | ............................ 417/243 |
| 3,134,536 | A | * | 5/1964 | Adams | ........................ 415/179 |
| 3,811,495 | A | * | 5/1974 | Laing | ............................ 165/85 |
| 4,062,401 | A | | 12/1977 | Rudny et al. | |
| 4,125,345 | A | * | 11/1978 | Yoshinaga et al. | .......... 417/243 |
| 4,373,577 | A | | 2/1983 | McMillen | |
| 4,550,775 | A | | 11/1985 | Edwards et al. | |
| 4,706,736 | A | | 11/1987 | Gyori | |
| 5,077,601 | A | | 12/1991 | Hatada et al. | |
| 5,078,206 | A | | 1/1992 | Goetz, Jr. | |
| 5,172,752 | A | | 12/1992 | Goetz, Jr. | |
| 5,303,770 | A | | 4/1994 | Dierbeck | |

(Continued)

FOREIGN PATENT DOCUMENTS

| | | |
|---|---|---|
| CH | 416 920 | 7/1966 |
| DE | 1 093 040 | 11/1960 |
| EP | 0 135 365 | 3/1985 |
| EP | 0 911 505 | 4/1999 |
| EP | 1 191 206 | 3/2002 |
| GB | 1 210 185 | 10/1970 |
| JP | 3-286992 | 12/1991 |

*Primary Examiner*—John K. Ford
(74) *Attorney, Agent, or Firm*—Wood, Phillips, Katz, Clark & Mortimer

(57) ABSTRACT

A rotary compressor machine, such as a combustion air charger, includes a rotatable shaft (18) having at least one compressor wheel (20,22) thereon and disposed within a housing (12,14). A donut-shaped heat exchanger (36) is located within the housing (12,14) between the compressor wheel (22) and an outlet (32) from the housing and has radially inner and outer peripheries (40,42). The outer periphery (40) defines an inlet for the heat exchanger (36) for gas discharged by the compressor wheel (20). The heat exchanger is provided with radially inner and outer flow paths defined by tubes (92) and includes a combined manifold and tank (44) which is secured and sealed to a header plate (88) receiving the tubes (92). The combined manifold and tank (44) includes first, second and third axially spaced walls (96,98,100) with each having a central opening (110, 112,114). The first wall (96), at its central opening (110) is sealed and mounted to a header plate (88) at its radially outer periphery while the second wall (98), at its central opening (112), mounts a baffle (116) that extends axially and abuts the header plate (88) to separate the radially inner and outer flow paths. The third wall 100), at its central opening (114), includes an annular, axial extension (120) sealingly secured to the header plate (88) at its radially inner periphery.

8 Claims, 4 Drawing Sheets

U.S. PATENT DOCUMENTS

| | | |
|---|---|---|
| 5,402,656 A | 4/1995 | Jaster et al. |
| 5,704,211 A | 1/1998 | Hatfield |
| 6,170,568 B1 | 1/2001 | Valenzuela |
| 6,173,493 B1 | 1/2001 | Dierbeck |
| RE37,134 E | 4/2001 | Wilson |
| 6,526,751 B1 | 3/2003 | Moeckel |
| 6,764,279 B2 * | 7/2004 | Meshenky ................. 415/179 |

* cited by examiner

TANK MANIFOLD FOR INTERNALLY MOUNTED RADIAL FLOW INTERCOOLER FOR A COMBUSTION AIR CHARGER

FIELD OF THE INVENTION

This invention relates to a heat exchanger used as an intercooler in a combustion air charging device such as a turbocharger or a supercharger for engines.

BACKGROUND OF THE INVENTION

Combustion air chargers, such as turbochargers or superchargers, have been employed with engines, particularly internal combustion engines, for many years. In a turbocharger, at least one rotary compressor wheel is driven by the exhaust of the engine. In the case of a supercharger, at least one rotary compressor wheel is driven mechanically, usually by the rotary output of the engine. In either case, the compressor wheel is employed to compress ambient air prior to its admission to the engine to support combustion therein. Because the air is compressed, a given volume thereof will have a greater mole content of oxygen than an otherwise equal of volume of air at ambient pressure. As a consequence, the additional oxygen permits the combustion of a greater quantity of fuel so that for a power plant of a given size, a greater power output may be derived as a result of the charging of the combustion air.

Over the years, it has been determined that the efficiency of such combustion air charging devices can be improved through the use of a so-called intercooling system. Because the air is heated as it is compressed, part of the efficiency derived by employing the combustion air charging device in the first place, i.e., the densification of the combustion air charged to the engine, is lost because a volume of hot compressed air will contain less oxygen than an equal volume of cooler compressed air when both are at the same pressure. Thus, for a given pressure, upon admission to an engine for combustion, a cooler combustion air charge will allow the development of more power within the engine than the same charge at the same pressure if at a higher temperature.

Consequently, intercoolers as mentioned previously have been employed to cool the air after it exits the combustion air charger (or a stage thereof) and prior to its admission to the engine so as to provide, for any given pressure, a maximum mole content of oxygen.

In many cases, the intercooler will be employed as a conventional, rectangular-shaped heat exchanger and is mounted side-by-side or to the front or rear of the usual heat exchanger employed for cooling engine coolant. While this sort of an arrangement adequately handles the cooling of the pressurized combustion air, it may have certain constraints in terms of size and the volume available in an engine compartment as, for example, in a vehicle, that houses both the engine and the various heat exchangers employed for cooling. It also may require extensive hose connections between the turbocharger, the intercooler and the engine combustion air inlet which necessarily require relatively large diameter hoses because of the low density of the combustion air and the consequent large volume thereof.

It has therefore been proposed to incorporate the intercooler within the combustion air charger itself to provide a more compact combustion air charging and intercooling system as well as to avoid large, bulky hose connections to the extent possible. The difficulty here is to incorporate the intercooling heat exchanger within the combustion air charger in such a way that it may be easily serviced, requires a minimum of plumbing connections and is readily manifolded so as to not unduly increase the bulk of the combustion air charger.

The present invention is directed toward the provision of advantageous solutions to these problems in an intercooling heat exchanger that is intended to be located internally within the combustion air charger for an engine.

SUMMARY OF THE INVENTION

It is the principal object of the invention to provide a new and improved rotary compressor machine with cooling for use in providing cooled, compressed air for any of a variety of uses. It is also an object of the invention to provide an improved combustion air charging apparatus with an internal intercooler that is more compact than known such systems, that is easily serviced, and/or which requires a minimum of plumbing connections to the engine with which the system is used.

According to one facet of the invention, an exemplary embodiment thereof achieves one or more of the above objects in a rotary machine that includes a rotatable shaft having at least one compressor wheel thereon and a two part housing containing the compressor wheel and having an inlet to the compressor wheel and an outlet. A heat exchanger is disposed in the housing and is located between the compressor wheel and the outlet. The heat exchanger includes a donut-shaped core having a gas flow path with a substantial radial extent, a header plate having radially inner and outer peripheries, and a gas inlet in fluid communication with the compressor wheel at a radially outer side of the core and a gas outlet in fluid communication with the housing outlet. A coolant flow path is provided in the heat exchanger in heat exchange relation with the gas flow path and has a substantial axial extent.

Preferably, the coolant flow has a radially inner section and a radially outer section which are connected so that coolant flows first through one and then the other. The heat exchanger includes a combined manifold and tank secured and sealed to a header plate forming one side of the core which includes walls defining first and second, axially spaced, side-by-side annular spaces separated by an annular baffle extending axially from one of the walls into a substantial abutment with the header plate between different radially spaced locations that separate the radially inner coolant flow path from the radially outer coolant flow path. The combined manifold and tank assembly is removably mounted to the housing in sandwiched relation between the parts of the housing.

According to a preferred embodiment, the tank assembly walls include first, second and third axially spaced walls, each having a central opening. The first wall is sealingly secured to, at its central opening, the header plate at the radially outer periphery thereof. The second wall, at its central opening, mounts the baffle that engages the header plate between parts of the coolant flow path and the third wall, at its central opening, includes an annular, axially axial extension sealingly secured to the header plate at its radially inner periphery.

Preferably, the first, second and third walls and the first and second annular spaces defined thereby extend radially outward of the radially outer periphery of the header plate.

Such an extension may be employed as a mounting flange for mounting the manifold and tank assembly between the two parts of the housing.

In a preferred embodiment, the manifold and tank assembly has at least one first port opening to a space between the first and second walls and at least one second port opening to a space between the second and third walls.

Preferably, at least one of the ports is in an annular wall at the radially outer part of the manifold and tank assembly.

In a preferred embodiment, the rotary compressor machine is a turbocharger or supercharger used in a combustion air charging system.

Other objects and advantages will become apparent from the following specification taken in connection with the accompanying drawings.

DESCRIPTION OF THE PREFERRED EMBODIMENTS

Figure 1:
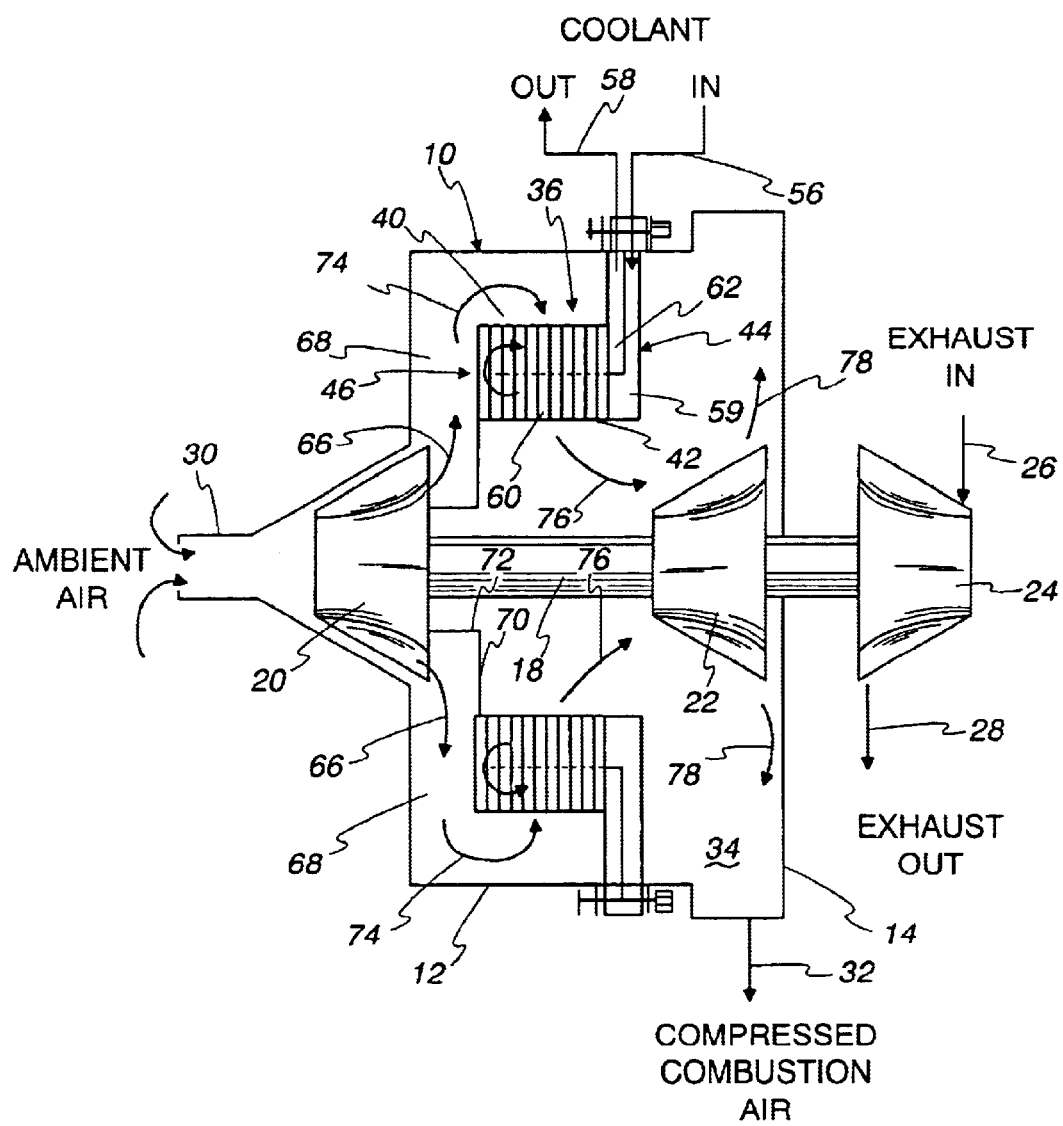
FIG. 1 is a somewhat schematic, sectional view of a rotary compressor machine, specifically a combustion air charger, made according to the invention.

The exemplary embodiments of the invention described herein are specifically disclosed as combustion air chargers in the form of a two stage turbocharger. However, it is to be understood that this description is for exemplification purposes and no restriction to turbochargers or to the number of stages is intended. For example, the invention may be employed with efficacy in a single stage turbocharger and may be employed in single or multiple stage superchargers as well. Generically, turbochargers and superchargers are referred to herein as combustion air chargers and no limitation to either turbochargers or to superchargers is intended except insofar as expressly stated in the appended claims. Similarly, the invention is susceptible to use as a rotary compressor machine in any of a variety of uses where it is desired to cool compressed air heated by a rotary compressor prior to its delivery to a point of use; and again, no limitation to a combustion air charging device or system is intended except as recited in the appended claims. With the foregoing in mind, attention is directed to FIG. 1.

The exemplary embodiment of the invention is seen to include a housing, generally designated 10, formed of at least two separable sections, 12 and 14 respectively. Preferably the housing sections are joined at a circular interface (not shown) which then allows relative rotation between the sections 12 and 14 during the assembly process to accommodate spacial constraints and/or to speed assembly. Journalled within the housing 10 by any suitable bearings (not shown) is a rotary shaft 18. In the illustrated embodiment, the rotary shaft mounts a first compressor wheel 20, a second compressor wheel 22 and turbine wheel 24 which, in turn, will be located within a housing (not shown). As indicated by an arrow 26, the turbine wheel 24 is driven by the exhaust from an internal combustion engine to drive the shaft 18. Spent exhaust is outletted from the turbine wheel 24 as indicated by an arrow 28.

The housing 12 includes an ambient air inlet 30 while the housing 14 includes a compressed air outlet, schematically indicated by an arrow 32. The inlet 30 is to the inlet side of the compressor wheel 20 while the outlet 32 is from a volute, schematically illustrated at 34, on the outlet side of the compressor wheel 22.

A heat exchanger, generally designated 36, is contained within the housings 12,14 where the two are joined together by removable fasteners. The heat exchanger 36 is donut-shaped or ring-shaped and includes a radially outer cylindrical surface 40 which defines an air inlet for the passage of air through the heat exchanger 36. A radially inner cylindrical surface 42 forms an air outlet for the heat exchanger 36.

The sides of the heat exchanger are provided with a manifold and tank, generally designated 44, on the side of the heat exchanger 36 facing the housing 14 and a redirecting header and tank, generally designated 46, on the side of the heat exchanger 36 within the housing 12. The manifold and tank 44 is provided with a coolant inlet schematically illustrated by an arrow 56 and a coolant outlet 58 schematically illustrated by an arrow. By a construction to be described in greater detail hereinafter, a coolant, such as coolant for the internal combustion engine, enters the turbocharger through the inlet 56 and is passed to a radially inner manifold and tank section 59 from which it flows into the core of the heat exchanger 36 at a radially inner part thereof to flow axially through the heat exchanger 36 to the reentrant header and tank 46 where its direction is reversed to flow through the radially outer part of the heat exchanger 36 back to a radially outer section 62 and then to the coolant outlet 58. This flow of coolant is indicated by arrow 64.

Air flow through the turbocharger is as follows. Ambient air enters in the inlet 30 and passes to the inlet side of the compressor wheel 20. As the compressor wheel 20 is driven by the turbine wheel 24, the air is compressed and discharged at an elevated pressure on the radially outer periphery of the compressor wheel 20 as indicated by arrows 66. The compressed air continues to flow radially outwardly through an annular space 68 between the housing 12 and the heat exchanger 36 which is in part defined by the reentrant header and tank 46, a radial baffle 70 extending radially inwardly from the reentrant header and tank 46 and an axial baffle 72 which extends from the baffle 70 at its radially innermost part to mount on a part of the housing 12 (not shown) in adjacency to the turbine wheel 20.

The radially outer side or periphery 40 of the heat exchanger 36 is spaced radially inwardly from the housings 12 and 14 allowing the air compressed by the turbine wheel 20 to be redirected as indicated by arrows 74 to enter the heat exchanger 36 at the radially outer periphery 40 thereof. The air then passes through the heat exchanger 36 in a radially inward direction and is cooled by the coolant that flows axially through the heat exchanger 36 as mentioned earlier. The cooled, compressed air is then discharged from the heat exchanger 36 as indicated by arrows 76 to the inlet side of the compressor wheel 22 whereat it is further compressed and then discharged into the volute 34 as indicated by arrows 78. This compressed air is then discharged as compressed combustion air to the internal engine to support combustion therein. If desired, additional cooling stages could be included between the compressor wheel 22 and the engine. Alternatively, as mentioned previously, in a single stage turbocharger, the compressor wheel 22 can be omitted in which case the air being discharged from the radially inner side of periphery 42 of the heat exchanger 36 could be discharged directly into the volute 34.

Figure 2:
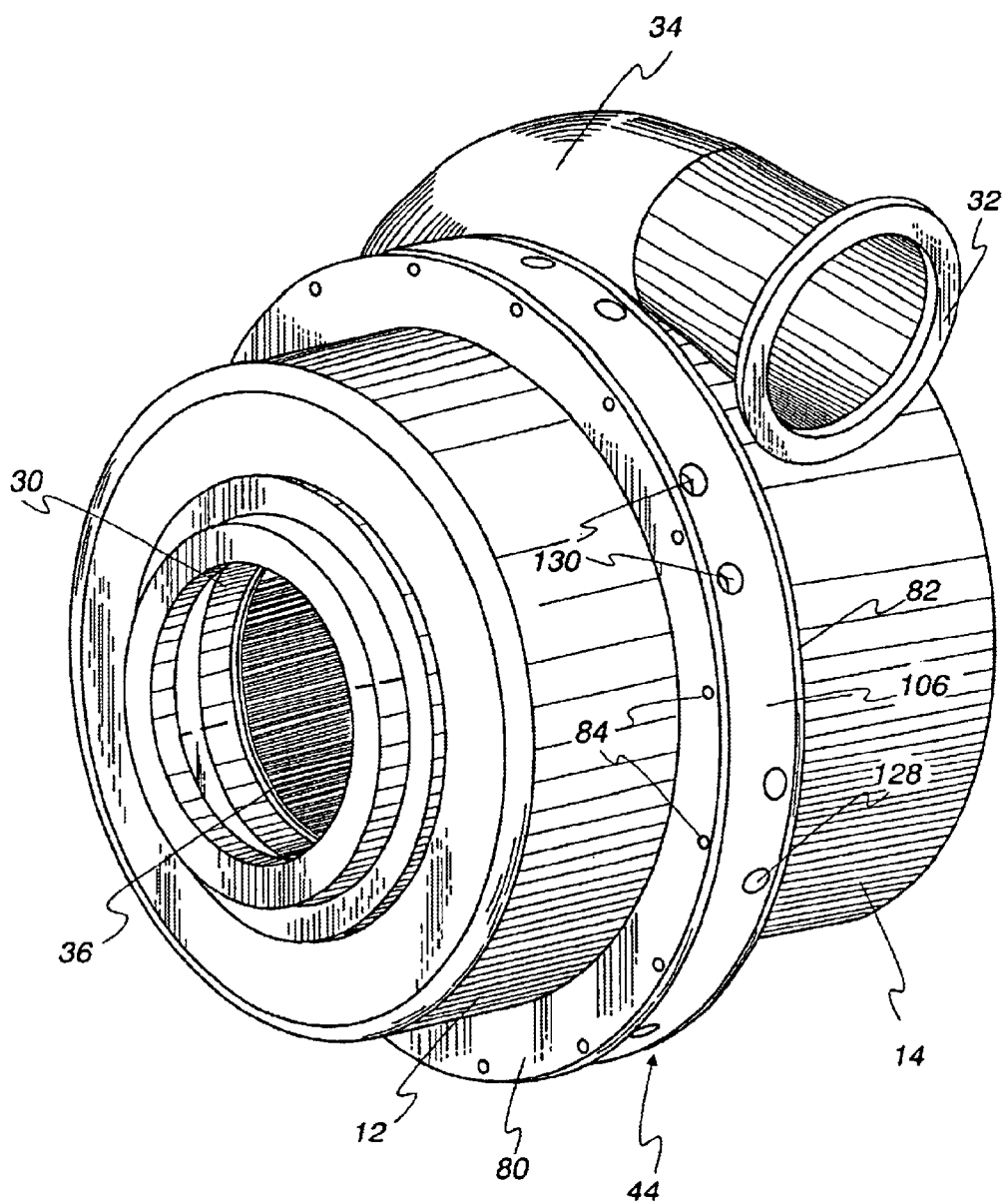
FIG. 2 is a perspective view showing a combined manifold and tank made according to the invention installed between two parts of a turbocharger housing.
Figure 3:
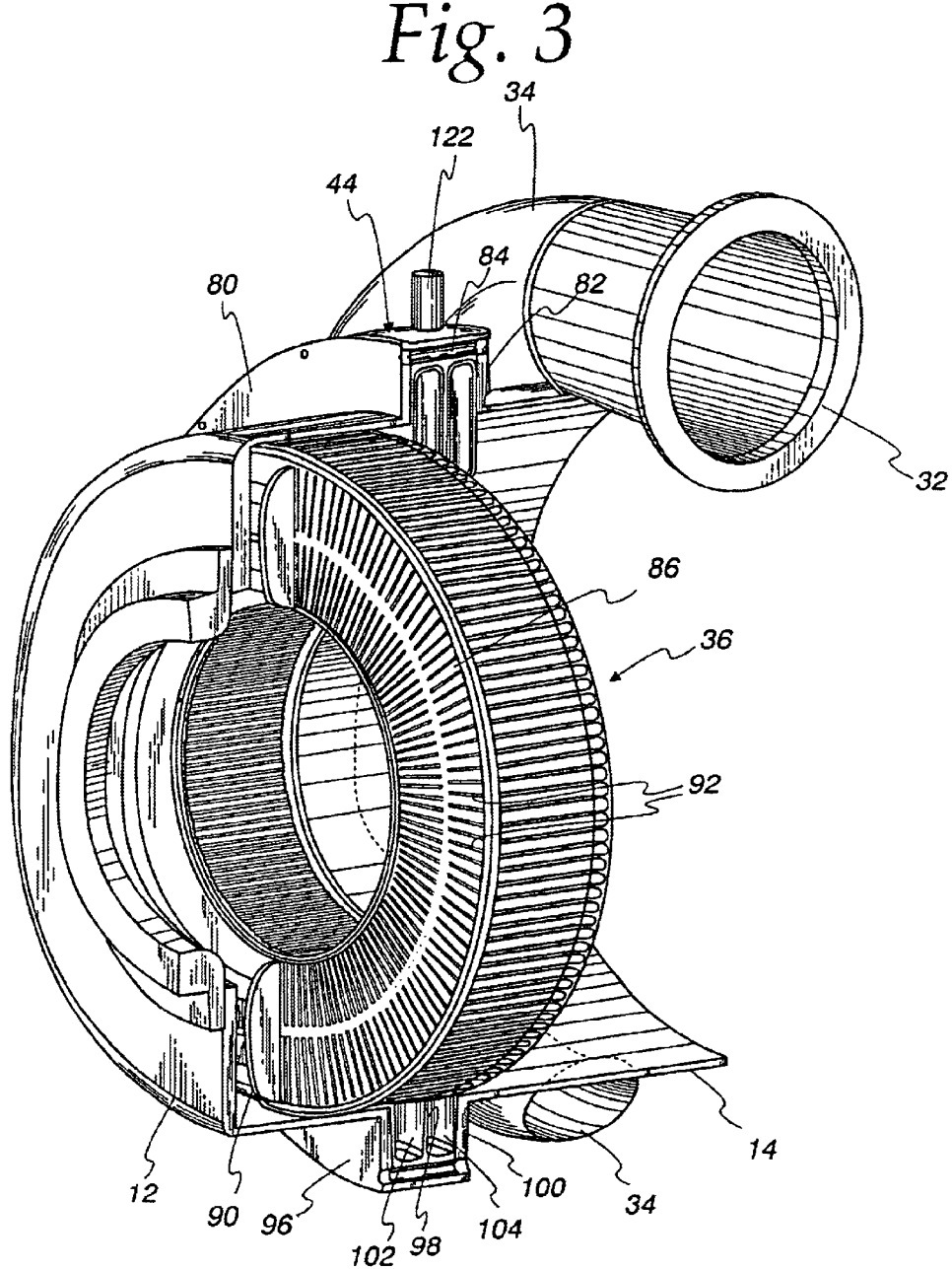
FIG. 3 is a view similar to FIG. 2 but with parts broken away for clarity.
Figure 4:
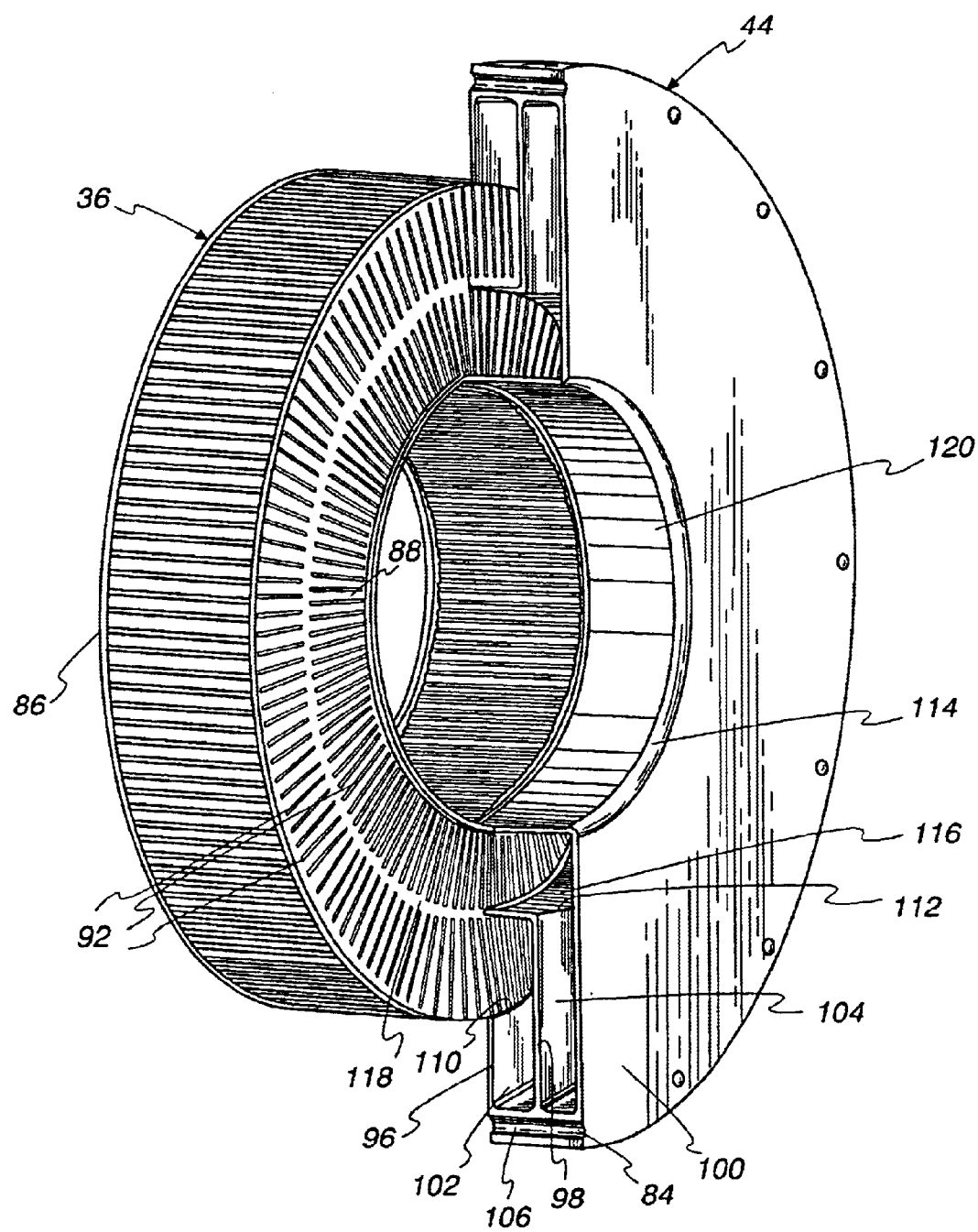
FIG. 4 is a perspective view, with parts broken away for clarity, of a heat exchanger employed in the invention together with a combined manifold and tank made according to the invention.

Turning now to FIGS. 2–4, inclusive, the heat exchanger 36 and the manifold and tank 44 will be described in detail.

It is initially noted that the heat exchanger 36 may conveniently be constructed as described and illustrated in the commonly assigned, copending application of Meshenky et al entitled "Internally Mounted Radial Flow Intercooler for a Combustion Air Charger", filed Sep. 20, 2002, Ser. No. 10/251,537, the entire disclosure of which is herein incorporated by reference.

The housing 12 includes a radially outwardly directed peripheral flange 80. A similar flange 82 is disposed on the housing 14 and is of the same size as the flange 80. The manifold and tank 44 is sandwiched between the flanges 80 and 82 and aligned bores 84 in all three may receive threaded fasteners (not shown) for securing the manifold and tank 44 between the housing sections 12,14.

The heat exchanger 36 is best illustrated in FIGS. 3 and 4 and is seen to include, on each side thereof, a header 86,88, respectively. The header 86 forms part of the header and tank 46, the latter also including an annular tank 90 fitted to and sealed against the header 86.

Extending between the headers 86 and 88 are a plurality of straight tubes 92 which are received in tube slots in the headers 86,88 and metallurgically bonded and sealed thereto. The tubes 92 are in two rows as may be seen in each of FIGS. 3 and 4 with the inner row of tubes 92 defining the radially inner flow path referred to previously and the radially outer tubes 92 forming the radially outer flow path. The tank 90 provides for fluid communication between the tubes 92 of both rows.

Fins (not numbered), which may be plate fins or serpentine fins, extend between the tubes 92 and serve to define, along with the headers 86,88, a gas flow path through which the compressed gas flows in the manner mentioned previously.

The heat exchanger 36 may be formed in a single piece as illustrated in the drawings or may be formed of a plurality of arcuate segments that are fitted together to define an annular heat exchanger.

The manifold and tank 44 is best understood from a consideration of FIGS. 3 and 4. With reference to FIG. 4, it is seen that the same includes three radially extending walls 96, 98 and 100. The walls are axially spaced from one another to define first and second spaces 102 and 104. An annular, radially outer wall 106 connects the walls 96,98,100 together and includes the fastener receiving bores 84.

Each of the walls 96,98,100 includes a central opening 110,112,114, respectively. The central openings 110, 112 and 114 are of progressively smaller diameter so that the wall 96, at its central opening 110, may be metallurgically bonded and sealed, as by brazing, to the header plate 88 at its radially outer periphery. Alternatively, the wall 96 may simply be removably sealed to the header plate 88.

The wall 98, at its central opening 112, mounts an axially directed baffle 116 which extends axially into engagement with an imperforate region 118 of the header 88 located between the two rows of tubes 92 to form a gross seal thereat so as to segregate the two rows for providing the flow path described previously.

The wall 100, at its central opening 114, includes an axial extension 120 which extends to the radially inner periphery of the heat exchanger 36, and specifically, the header 88 thereof to be bonded metallurgically and sealed thereto, or in the alternative, merely removably sealed thereto.

The manifold and tank 44, and specifically, the annular outer wall 106 thereof, is provided with two ports (only one of which is shown in FIG. 3) and which is designated 122.

The port 122 as shown extends to the space 104 to establish fluid communication therewith. A similar port (not shown) extends to the space 102 for the same purpose.

If desired, rather than employ tubular ports as illustrated in FIG. 3, to promote uniformity of flow or for use where the heat exchanger 36 is formed of a plurality of annular segments, multiple bores 128 forming ports may be provided to extend to the space and multiple bores 130 may be provided to extend to and serve as ports for the space 102.

It will be observed from either FIGS. 3 and 4 that the walls 96,98,100 have a greater diametrical dimension than does the heat exchanger 36 or the housings 12 and 14, apart from the flanges 80,82. Thus, radially outer parts of the walls, together with the annular outer wall 106 serve as mounting flange to be received between the mounting flanges 80,82 as shown in FIGS. 2 and 3.

It will be appreciated that the manifold and tank 44 provide the function of a tank in directing coolant to or collecting coolant from the rows of the tubes 92. It will also be appreciated that the same provides a manifold function in terms of distributing coolant coming to or from the source to the tank-like spaces that open to the header 88 as well. The same may be made relatively thin so that the size of the rotary machine is not unduly increased axially and may be employed with existing mounting flanges on the housings 12 and 14 for suitable mounting purposes.

The heat exchanger 36 may be mounted only to the manifold and tank 44 allowing the side thereof including the tank 90 and the header plate 86 freedom of movement in the axial direction within the turbocharger to accommodate temperature changes and thereby minimize thermal stress that could result in undesirable fatigue of the parts.

The construction is such that potential coolant leakage points within the machine are reduced to a minimum.

In some cases, it may be desirable to thermally join diffuser vanes (sometimes referred to as flow straighteners) to the tank 46 and/or the manifold and tank 44 as more fully disclosed in commonly assigned Ser. No. 10/256,863, filed Sep. 27, 2002 in the name of Steven P. Meshenky, the entire disclosure of which is incorporated by reference.

The geometric configuration is simple and thus easy to manufacture.

What is claimed is:

1. A rotary compressor machine including:

a rotatable shaft having at least one compressor wheel mounted thereon;

a housing formed of two separable parts with one part encompassing said at least one compressor wheel, said housing journalling said shaft, and having an inlet to said compressor wheel in said one part and an outlet in the other of said parts; and a donut-shaped heat exchanger within said housing one part and between said compressor wheel and said outlet and having radially inner and outer peripheries, one said periphery defining an inlet for receiving compressed gas from said compressor wheel and the other said periphery defining an outlet for discharging compressed gas toward said housing outlet, said heat exchanger including tube constructions defining coolant flow paths and having ends at a header plate, and characterized by the coolant flow paths being generally axial with first flow paths directing fluid away from said header plate and second flow paths returning the fluid to the header plate with said first and said second flow paths being grouped and opening to said header plate at different, radially spaced locations, and a combined manifold and tank sealed to said header plate including walls defining first and second, axially spaced, side-by-side annular spaces separated by an annular baffle extending axially from one of said walls into substantial abutment with said header plate between said different, radially spaced locations, said combined manifold and tank assembly being removably mounted to said housing in sandwiched relation between said first and second parts.

2. The rotary compressor machine of claim 1 wherein said combined manifold and tank assembly walls include first, second and third axially spaced walls each having a central opening, said first wall being sealed to, at its central opening, said header plate at said radially outer periphery, said second wall, at its central opening, mounting said baffle, and said third wall, at its central opening, including an annular, axial extension sealed to said header plate at said radially inner periphery.

3. The rotary compressor machine of claim 2 wherein said first, second and third walls and said first and second annular spaces extend radially outward of said radially outer periphery.

4. The rotary compressor machine of claim 1 wherein said walls and said first and second annular spaces extend radially outward of said radially outer periphery.

5. The rotary compressor machine of claim 1 wherein said housing, said compressor wheel and said shaft define a combustion air charger.

6. A heat exchanger for installation in a two part housing of a rotary compressor machine for use as an intercooler, comprising a donut-shaped heat exchanger having radially inner and outer peripheries, one said periphery defining an inlet for receiving compressed gas and the other said periphery defining an outlet for discharging compressed gas, said heat exchanger including tube constructions defining coolant flow paths and having ends at a header plate, the coolant flow paths being generally axial with first flow paths directing fluid away from said header plate and second flow paths returning the fluid to the header plate with said first and said second flow paths being grouped and opening to said header plate at different, radially spaced locations, and a combined manifold and tank sealed to said header plate including walls defining first and second, axially spaced, side-by-side annular spaces separated by an annular baffle extending axially from one of said walls into substantial abutment with said header plate between said different, radially spaced locations, said combined manifold and tank assembly adapted to be removably mounted to said housing in sandwiched relation between said two parts.

7. A heat exchanger for installation in a rotary compressor machine for use as an intercooler, comprising:
   a donut-shaped core having at least one row of axially extending tubes and ring-like header plates with radially inner and outer peripheries at each side of said row, said header plates having tube slots sealingly receiving the ends of the tubes in the row, said tubes defining radially inner and radially outer flow paths, and fins extending between said tubes;
   a tank sealingly fitted to one of said header plates oppositely of said tubes to interconnect said radially inner and outer flow paths thereat; and
   a combined manifold and tank sealingly fitted to the other of said headers oppositely of said tubes and including three axially spaced, radially extending walls, each having a central opening and each extending radially outward of the radially outer periphery of said core to terminate in a radially outer mounting flange;
   a first of said walls, at its central opening, being sealed to said other header at its radially outer periphery;
   a second of said walls, at its central opening, including an annular, axially extending baffle engaging said other header at a location between said radially inner and said radially outer flow paths; and
   a third of said walls, at its central opening, being sealed to said other header plate at its radially inner periphery;
   said first, second and third walls being loped at their radially outer ends by an annular wall;
   at least one first port opening to a space between said first and second walls; and
   at least one second port opening to a space between said second and third walls.

8. The heat exchanger of claim 7 wherein at least one of said ports is in said annular wall.

* * * * *

UNITED STATES PATENT AND TRADEMARK OFFICE
CERTIFICATE OF CORRECTION

| | | |
|---|---|---|
| PATENT NO. | : 6,929,056 B2 | Page 1 of 1 |
| APPLICATION NO. | : 10/313210 | |
| DATED | : August 16, 2005 | |
| INVENTOR(S) | : Steven P. Meshenky et al. | |

It is certified that error appears in the above-identified patent and that said Letters Patent is hereby corrected as shown below:

Column 8, line 35, delete "loped" and substitute therefor --joined--.

Signed and Sealed this

Twenty-seventh Day of March, 2007

JON W. DUDAS
*Director of the United States Patent and Trademark Office*